United States Patent
Defaix et al.

(10) Patent No.: US 7,680,932 B2
(45) Date of Patent: Mar. 16, 2010

(54) VERSION CONTROL SYSTEM FOR SOFTWARE DEVELOPMENT

(75) Inventors: Florence Defaix, Mouans Sartoux (FR); Michael Doyle, Kitchener (CA); Ross Wetmore, Waterloo (CA)

(73) Assignee: MKS Inc., Waterloo, ON (CA)

( * ) Notice: Subject to any disclaimer, the term of this patent is extended or adjusted under 35 U.S.C. 154(b) by 844 days.

(21) Appl. No.: 10/666,316

(22) Filed: Sep. 19, 2003

(65) Prior Publication Data

US 2004/0133444 A1    Jul. 8, 2004

Related U.S. Application Data

(60) Provisional application No. 60/411,875, filed on Sep. 20, 2002.

(51) Int. Cl.
   *G06F 15/173* (2006.01)
(52) U.S. Cl. .................. 709/225; 709/203; 709/210; 717/110
(58) Field of Classification Search ........... 717/122; 709/210, 242
   See application file for complete search history.

(56) References Cited

U.S. PATENT DOCUMENTS

| | | | |
|---|---|---|---|
| 4,558,413 A | | 12/1985 | Schmidt et al. |
| 5,278,979 A | | 1/1994 | Foster et al. |
| 5,339,435 A | | 8/1994 | Lubkin et al. |
| 5,574,898 A | | 11/1996 | Leblang et al. |
| 5,623,659 A | * | 4/1997 | Shi et al. .................. 707/8 |
| 5,649,200 A | | 7/1997 | Leblang et al. |
| 5,675,802 A | * | 10/1997 | Allen et al. .................. 717/103 |
| 5,819,295 A | * | 10/1998 | Nakagawa et al. ........... 707/203 |
| 5,935,207 A | * | 8/1999 | Logue et al. ................. 709/219 |
| 6,026,474 A | * | 2/2000 | Carter et al. ................. 711/202 |
| 6,035,281 A | * | 3/2000 | Crosskey et al. .............. 705/14 |
| 6,038,601 A | * | 3/2000 | Lambert et al. ............. 709/226 |
| 6,065,046 A | * | 5/2000 | Feinberg et al. ............. 709/216 |
| 6,101,328 A | * | 8/2000 | Bakshi et al. ................. 717/170 |
| 6,119,157 A | * | 9/2000 | Traversat et al. ............ 709/220 |
| 6,144,996 A | * | 11/2000 | Starnes et al. ................ 709/217 |
| 6,167,446 A | * | 12/2000 | Lister et al. .................. 709/223 |

(Continued)

FOREIGN PATENT DOCUMENTS

WO    WO 01/95116 A2    12/2001

(Continued)

OTHER PUBLICATIONS

O'Donovan Brian and Jane B. Grimson; "A distributed version control system for wide area networks"; Software Engineering Journal; Sep. 1990; vol. 5, Issue 5; pp. 255-262.*

(Continued)

*Primary Examiner*—Wei Y Zhen
*Assistant Examiner*—Phillip H Nguyen
(74) *Attorney, Agent, or Firm*—Dowell & Dowell pc

(57) ABSTRACT

A version control system for managing versioned files comprises a central server storing a repository of the versioned files. At least one proxy is connected to the central server. Each proxy includes a read-only cache for storing data from the repository. At least one client is connected to each of the proxies. Modifications to the versioned files may only be made by the central server.

30 Claims, 8 Drawing Sheets

U.S. PATENT DOCUMENTS

| | | | |
|---|---|---|---|
| 6,185,563 B1* | 2/2001 | Hino | 707/8 |
| 6,286,006 B1* | 9/2001 | Bharat et al. | 707/100 |
| 6,353,831 B1* | 3/2002 | Gustman | 707/103 R |
| 6,393,437 B1* | 5/2002 | Zinda et al. | 707/201 |
| 6,427,172 B1* | 7/2002 | Thacker et al. | 709/235 |
| 6,438,743 B1 | 8/2002 | Boehm et al. | |
| 6,513,061 B1* | 1/2003 | Ebata et al. | 709/203 |
| 6,584,476 B1* | 6/2003 | Chatterjee et al. | 707/203 |
| 6,629,138 B1* | 9/2003 | Lambert et al. | 709/224 |
| 6,662,198 B2* | 12/2003 | Satyanarayanan et al. | 707/204 |
| 6,681,225 B1* | 1/2004 | Uceda-Sosa et al. | 707/8 |
| 6,757,893 B1* | 6/2004 | Haikin | 717/170 |
| 6,912,645 B2* | 6/2005 | Dorward et al. | 711/216 |
| 6,915,307 B1* | 7/2005 | Mattis et al. | 707/103 R |
| 7,114,008 B2* | 9/2006 | Jungck et al. | 709/246 |
| 7,171,469 B2* | 1/2007 | Ackaouy et al. | 709/225 |
| 7,281,050 B2* | 10/2007 | Dinker et al. | 709/229 |
| 7,293,027 B2* | 11/2007 | Margolus | 707/10 |
| 2003/0018878 A1* | 1/2003 | Dorward et al. | 711/216 |
| 2003/0177197 A1* | 9/2003 | de Bonet et al. | 709/213 |
| 2004/0003101 A1* | 1/2004 | Roth et al. | 709/231 |
| 2004/0019612 A1* | 1/2004 | Tyra et al. | 707/104.1 |
| 2004/0088559 A1* | 5/2004 | Foster et al. | 713/193 |
| 2004/0205149 A1* | 10/2004 | Dillon et al. | 709/217 |
| 2006/0059253 A1* | 3/2006 | Goodman et al. | 709/223 |

FOREIGN PATENT DOCUMENTS

WO     WO 01/95116 A3    12/2001

OTHER PUBLICATIONS

Quinlan, Sean; "A Cached WORM File System", 1991 Software Practice and Experience vol. 21-12, pp. 1-11, retrieved from scholar.google.com search Dec. 13, 2007.*

Quinlan, Sean; Dorward, Sean; "Venti: a new approach to archival storage", URL <https:/www.usenix.org/publications/library/proceedings/fast02/quinlan/quinlan_html/> by scholar.google.com search Dec. 13, 2007.*

Microsoft Computer Dictionary, Fifth Edition (2002), p. 104, p. 212-213, p. 437.—definitions for 'cluster', 'file server', RAID.*

Chervenak, Ann L; Vellanki, Vevekanand; Kurmas, Zachary; "Protecting File Systems: A Survey of Backup Techniques", IEEE 1998, retrieved Dec. 13, 2007.*

Cooper, Brian; Crespo, Arturo; Garcia-Molina, Hector; "Implementing a Reliable Digital Object Archive", Springer Link 2000, retrieved Nov. 28, 2007.*

MacDonald, Joshua P; "File System Support for Delta Compression", CiteSeer 2000, retrieved Nov. 28, 2007.*

Kamita, T, et al. "A Database Architecture and Version Control for Group Work." System Sciences, 1994. vol. III: Information Systems: Decision Support and Knowledge-Based Systems, Proceedings of the Twenty-seventh Hawaii International Conference on Wailea, HI, USA, Jan. 4-7, 1994, Los Alamitos, Ca, USA, IEEE Comput. Soc., Jan. 4, 1994, pp. 438-447, XP010097053, ISBN: 0-8186-5070-2.

Beech, David et al., Generalized Version Control in an Object-Oriented Database, Proceedings Fourth International Conference on Data Engineering p. 14-22, IEEE Computer Society Press, Washington, D.C., 1988.

Chou, H.T. et al, Versions and Change Notification in an Object-Oriented Database System, 25th ACM/IEEE Design Automation Conference, Proceedings 1988, IEEE, New York, NY 1988.

Davis, Russell, Software Checking with the Auditor's Aid, Planning Research Corporation, Washington D.C., Reprinted in IEEE, 1990.

Hendricks, A Filesystem for Software Development, USENIX, Summer, pp. 333-340, 1990.

Korn, et al., The 3-D File System, USENIX, Summer, pp. 147-156, 1989.

Mahler et al., Shape—A Software Configuration Management Tool, International Workshop on Software Version and Configuration, 1987.

Tichy, Walter F., RCS—A System for Version Control, Department of Computer Sciences, Purdue University, Indiana 47907, Jan. 3, 1991.

* cited by examiner

VERSION CONTROL SYSTEM FOR SOFTWARE DEVELOPMENT

CROSS REFERENCE TO RELATED APPLICATION

This application is a nonprovisional of U.S. provisional patent application No. 60/411,875 filed on Sep. 20, 2002 (the '875 application). The '875 application is hereby incorporated by reference as though fully set forth herein.

BACKGROUND OF THE INVENTION

1. Field of the Invention

The present invention relates to a version control system for software development.

2. Description of the Prior Art

When developing software, it is often important to keep track of changes made to source code. Small changes in the source code to fix bugs or make improvements can unexpectedly lead to large problems. Often, seemingly small changes lead to unexpected problems. Accordingly it is often necessary to keep track of revisions of source code. Version control systems provide tools to record the changes made by developers. The changes between revisions are often called deltas. It is convenient to store one full copy of a file along with the deltas required to reconstruct subsequent versions. Reverse-Delta storage is often used in order to allow the most recent versions to be accessed the fastest. Reverse-delta storage involves storing the full copy of the most recent version along with the changes required to obtain older versions. The changes from the most recent version to older versions are called reverse deltas since they are essentially the opposite of the changes made during development.

In large scale software development, multiple developers work on the same software project. They are each able to modify the files that make up the software project. There is a need for a system to manage the changes made by different developers to avoid conflicts.

Some version control systems, such as RCS (Revision Control System), provide a locked checkout mechanism to control access to files. A developer can checkout a file from a repository with a lock. After the file is locked, no other developer can modify the file. Only the developer who owns the lock can modify the file by checking in a new version.

Often developers are located in geographically separated areas connected by wide area networks yet still need to collaborate on the same software project. U.S. Pat. No. 5,675,802, teaches a geographically distributed version control system. The system has multiple development sites and uses replicas on each site. Access control is provided through mastership rules which govern the ability of each site to modify branches. A particular site can be the master of a particular branch. That site then holds the authoritative revision of that branch. The mastership rules prevent users at other sites from modifying their local copy of that branch. However, configuring and maintaining the mastership rules is an inconvenience for users. Furthermore, the rules must be evaluated for each revision, which can be computationally costly in certain environments. Moreover, the authoritative version of the system is spread among many locations. Accordingly, this type of system requires changes to be merged together at each location to ensure that all sites have up to date copies. This merging is sometimes computationally expensive, and typically requires human intervention to indicate that a merge should occur. In some cases, further human intervention may be required to resolve conflicts.

It is an object of the present invention to obviate or mitigate some of the above disadvantages.

SUMMARY OF THE INVENTION

The inventors have recognised that proxies may be provided at each geographic location to cache data required by users at that location. The inventors have recognised that committing write operations only at a central repository protects against conflicting changes.

According to another aspect of the present invention, there is provided a version control system for managing versioned files comprising a central server storing a repository of the versioned files, at least one proxy connected to the central server, each proxy including a read-only cache for storing data from the repository, and at least one client connected to each of the proxies. Modifications to the versioned files may only be made by the central server.

According to another aspect of the present invention, there is provided a method of modifying a repository of versions of files in a version control system including a central server and a client. The method comprises the steps of the client requesting from the central server a lock on a version of a file in the version control system. The central server checks whether the requested version in unlocked, and if so grants the request. The central server sends an update to other portions of the system.

According to another aspect of the present invention, there is provided a central server in a version control system including proxy servers connected to clients comprises a repository of versioned files, a version manager for providing version of files from the repository, an access control system for managing requests from clients to modify the repository, a log of changes made to the repository, and a list of connected proxies and portions of the repository. The proxies contain read-only caches of the portions of the repository for providing versions of files to the clients.

According to another aspect of the present invention, there is provided a proxy server in a version control system including a central server containing a repository of versioned files and a client. The proxy server comprises a read-only cache for storing data from the repository; and a version provider to provide a version of a file to the client. The version provider is configured to first check the read-only cache for the requested version and if it is not found, to request the version from the central server.

According to yet another aspect of the present invention, there is provided a computer readable medium containing processor instructions for implementing a version control system including a central server storing a repository of versioned files; at least one proxy connected to the central server, each proxy including a read-only cache for storing data from the repository; and at least one client connected to each of the proxies. Modifications to the versioned files may only be made by the central server.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
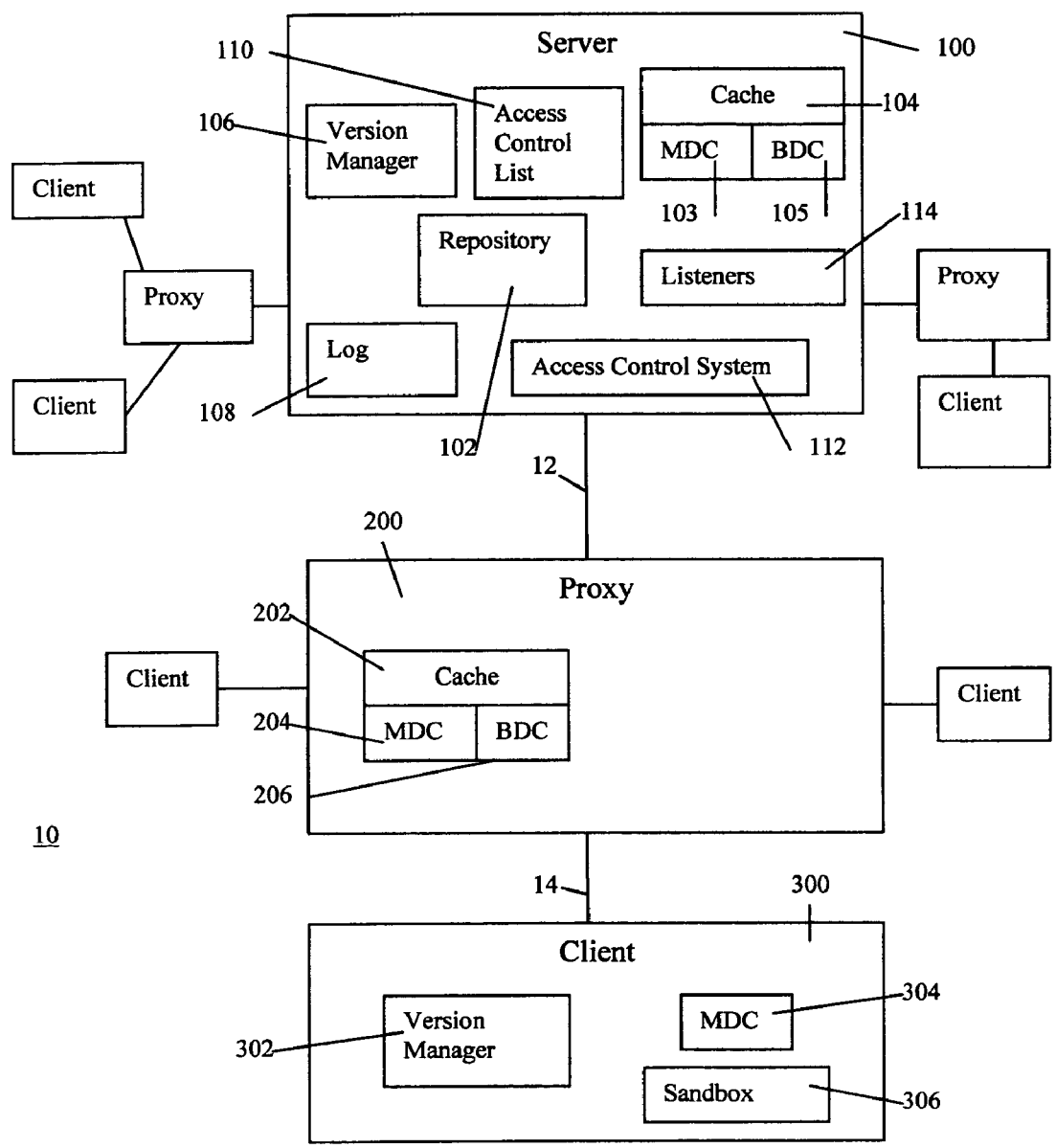
FIG. 1 is a schematic of a version control system.

Referring to FIG. 1, a version control system is shown generally by the numeral 10. The system includes a central server 100, geographically distributed proxy servers 200, and clients 300.

The central server 100 provides access to a repository 102 of data to each client 300 through respective proxy servers 200. Each proxy server 200 is connected to the central server 100 through a wide area network 12. Each client 300 is connected to a respective proxy server 200 through a local area network 14. The central server 100 includes a central server cache 104, a version manager 106, a log of changes 108, an access control list 110, an access control system 112, and a list of listeners 114.

Each of the central server 100, proxy server 200, and client 300 can include a processor. The processor is coupled to a display and to user input devices, such as a keyboard, mouse, or other suitable devices. If the display is touch sensitive, then the display itself can be employed as the user input device. The proxy server 200 and central server 100 may not be directly operable, and accordingly their user input devices may effectively be located in another network component for remote management. A computer readable storage medium is coupled to the processor for providing instructions to the processor to instruct and/or configure the various elements to perform steps or algorithms related to the version control system, as further explained below. The computer readable medium can include hardware and/or software such as, by way of example only, magnetic disks, magnetic tape, optically readable medium such as CD-ROMs, and semi-conductor memory such as PCMCIA cards. In each case, the medium may take the form of a portable item such as a small disk, floppy diskette, cassette, or it may take the form of a relatively large or immobile item such as hard disk drive, solid state memory card, or random access memory (RAM) provided in the support system. It should be noted that the above listed example media could be used either alone or in combination.

The repository 102 stores data such as meta-data and bulk data related to objects including versions of files organised in a configuration such as a project. For a file, the meta-data consists of information about the file, such as, by way of example only, the name of the user who created the revision, the time it was created, who has the file locked, and other details about the file. For a project, the meta-data records information about the project such as by way of example only the set of subprojects and files or members and revision numbers that make up the project.

Figure 2:
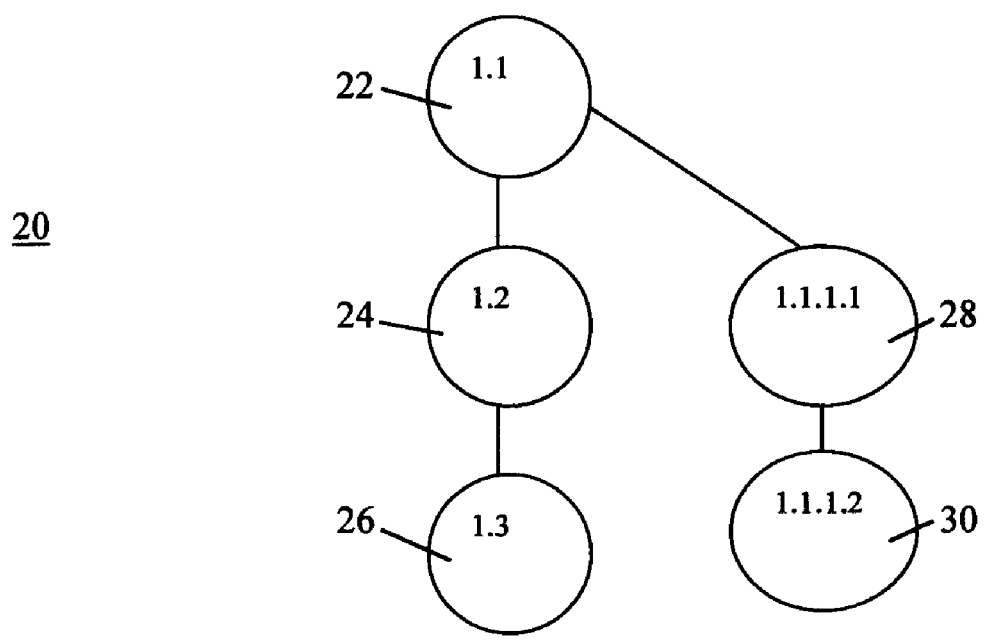
FIG. 2 is a schematic of a versioned file in the system of FIG. 1.

Referring to FIG. 2, an exemplary organisation of versions of a file in the repository 102 is shown in more detail by the numeral 20. The first version 22 is numbered 1.1. Successive versions are notionally organised in a tree structure. An updated version 24 is numbered 1.2. A further update 26 is numbered 1.3. Each revision records meta-data such as the changes made and who made the changes. An alternate revision 28 is numbered 1.1.1.1. A further revision 30 to revision 28 is numbered 1.1.1.2. Revision 26 is stored in full in the repository 102. The changes required to obtain revisions 24 and 22 from revisions 26 and 24 respectively are stored as deltas. Similarly the changes required to obtain revision 28 and 30 from revisions 22 and 28 respectively are stored as deltas. The versions themselves are referred to as bulk data. The repository 102 co-operates with the version manager 106 to provide specific versions of files in the repository. The latest version of the main branch is simply copied from the repository. Other versions 24, 22, 28, 30 are reconstructed by the version manager 106 by applying the stored deltas.

The central server cache 104 consists of a meta-data cache (MDC) 103 and a bulk data cache (BDC) 105. The meta-data cache 103 stores the information about the organisation and properties of the files into a versioned system. The bulk data cache 105 stores copies of specific versions or contents of files. The meta-data cache 103 is preferably stored in fast temporary storage such as random access memory (RAM) to provide faster access speed than that of the repository 102. The bulk data cache 105 is preferably stored on disk to allow specific versions to be retrieved faster than they can be reconstructed from the repository. If the server is shut down, then the temporary storage is cleared and the cache 104 may be erased. Since the repository 102 is typically located in or near the server 100, it will be recognised that repopulating the central server meta-data cache 103 is typically not a time consuming operation.

Each proxy server 200 has a cache 202 to store data from the repository 102. The cache 202 is separated into a meta-data cache 204 and a bulk data cache 206. As data is required by clients 300, it is stored in the cache 202 for further reference. The cache registers itself in the list of listeners 114 in the central server 100 in order to update the cache 202 when changes are made to the data in the repository 102. In order to facilitate downtime of the proxy server 200 upon disconnection from the network 12, the central server 100 uses the log 108 to record which objects in the repository have been changed. Upon reconnection to the network, the proxy server 200 receives the list of changed objects since it is registered as a listener. The data in the cache 202 related to changed objects is then invalidated, and the proxy server cache 202 must be repopulated with this data when requested by the client 300.

Each client 300 has a client version manager 302, and a meta-data cache 304 for storing information about the versioned file structure 20 shown in FIG. 2. Each client 300 has a sandbox 306 for storing local working copies of files from a corresponding project on the central server 100. If a client is working with more than one project then they may have more than one sandbox 306. The files in the sandbox 306 are (possibly modified) particular versions of files from the repository 102. The client preferably does not have a local bulk data cache for the file contents, since the client 300 is connected to the proxy server 200 through local area network 14. The client 300 can obtain data from the proxy server 200 as necessary since the local area network 14 is usually fast and reliable. Some files will also already be stored in the sandbox 306.

To access files not in its sandbox 306, the client 300 first requests the file from the proxy server 200. If the proxy server 200 has the file in its cache, then it immediately provides the file to the client 300. Otherwise, the proxy server 200 requests the file from the central server 100. The central server 100 first tries to serve the request from its server cache 104. If the server cache 104 does not contain the file, then the central server obtains the file from the repository 102. The repository 102 may have to reconstruct the version of the file from the most recent version by applying reverse deltas. The retrieved version is then stored in the server cache 104 for future use. It is also stored in the proxy cache 202, and ultimately provided to the client 300.

In order to modify data in the repository 102, the client's requests must be processed by the central server 100. Although such requests will usually pass through the proxy server 200, the proxy server 200 preferably acts as a router to pass the request to the central server 100. The central server controls changes to the repository 102 through the version manager 106 in order to prevent conflicting changes to data.

In use, the user of client 300 modifies objects in its sandbox 306. The user of client 300 will occasionally want to place a new revision of an object into the repository 102. The client 300 sends the revision to the central server 100 through the proxy server 200. The central server 100 then checks whether the client 300 is allowed to check in the new version. For example, if the file is locked, then only the owner of the lock can check in a new version. If the client 300 is not allowed to check in the new version, then the central server 100 informs the client 300 through the proxy 200 that its update is not allowed. Otherwise, the central server 100 stores the new revision in the repository 102 and then notifies all connected proxies 200 and clients 300 in the list of listeners 114 of the new version. This updating makes the new version immediately visible to any clients with the corresponding project open.

Figure 3:
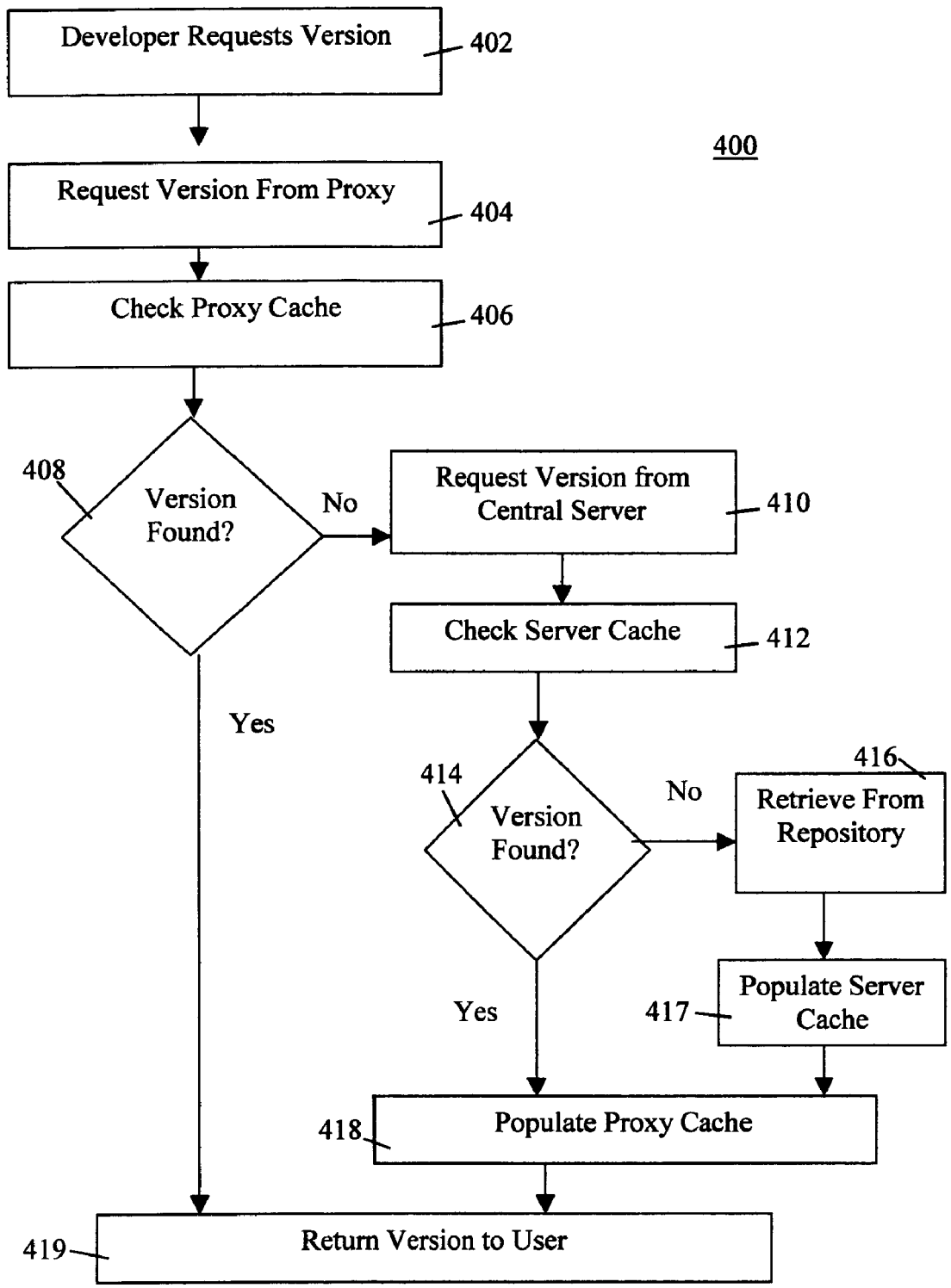
FIG. 3 shows a method performed by a client of FIG. 1.

Referring therefore to FIG. 3, the process of the client 300 requesting a version is shown generally by the numeral 400. The client first requests at step 402 the version of interest through the sandbox 306. At step 404, the client version manager 302 requests the version from the proxy server. At step 406, the proxy server checks the proxy cache 202 for the version of interest. If the version is found at step 408, then the version is passed to the client at step 419. If the version is not found, then at step 410 the proxy server requests the version from the central server. The central server first checks the central server cache for the file at step 412. If the file is found, then the version is returned to the proxy server at step 414. The proxy server updates its cache 202 with the version of the file at step 418, and sends the version to the client at step 419. If the file is not found, then the central server requests the version from the repository 102 at step 416. The central sever cache is populated with the version at step 417. The version is then placed in the proxy server cache at step 418 and provided to the client at step 419.

Figure 4:
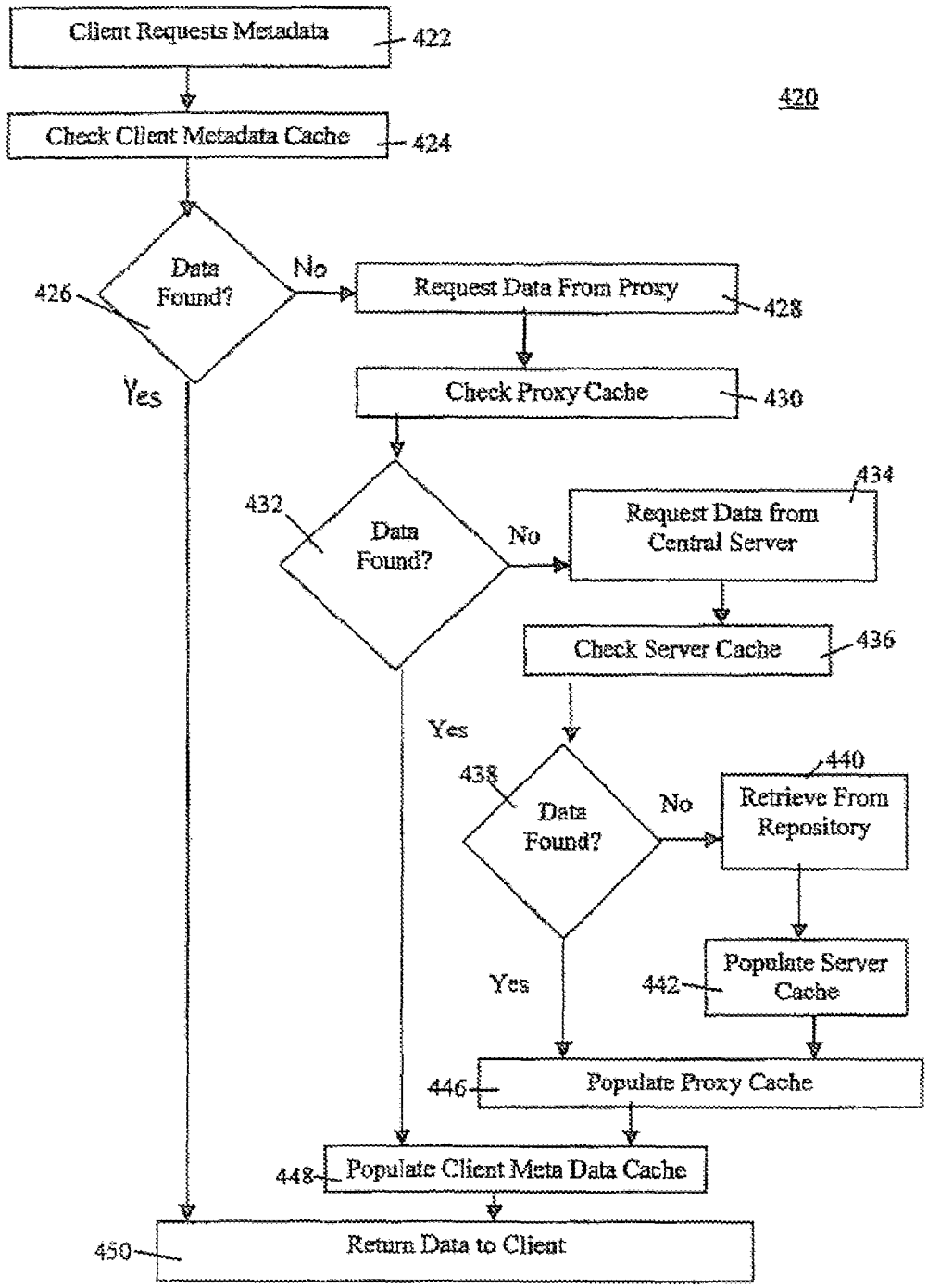
FIG. 4 shows another method performed by the client of FIG. 1.

Referring therefore to FIG. 4, the process of the client 300 requesting meta-data is shown generally by the numeral 420. The client first requests at step 422 the meta-data of interest through the sandbox 306. At step 424, the client 300 checks its meta-data cache. If the data is found at step 426 then it is returned to the client 300 at step 450. If not, then at step 428, the client version manager 302 requests the data from the proxy server. At step 430, the proxy server checks the proxy cache 304 for the data of interest. If the data is found at step 432, then the version is put in the client meta-data cache at step 448 and, passed to the client at step 450. If the version is not found, then at step 434 the proxy server requests the data from the central server. The central server first checks the central server cache for the data at step 436. If the data is found at step 438, then data proxy server updates its cache with the data at step 446, updates the client cache at step 448 and sends the data to the client at step 450. If the data is not found, then the central server requests the data from the repository 102 at step 440. The central server cache is populated with the data at step 442. The data is then placed in the proxy server cache at step 446, the client cache at step 448 and provided to the client at step 450.

Figure 5:
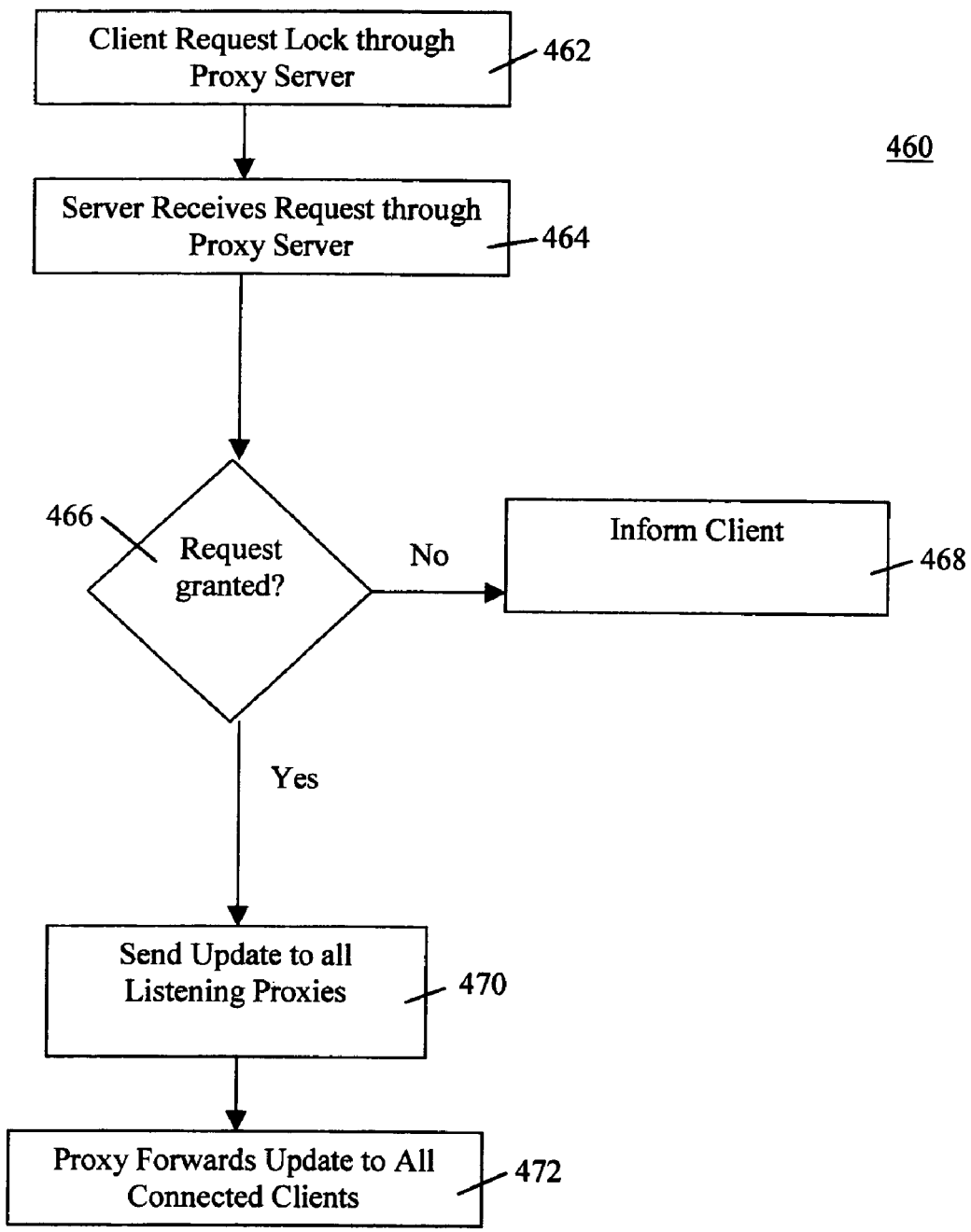
FIG. 5 shows yet another method performed by the client of FIG. 1.

Referring to FIG. 5, a lock process performed by the client 300 is shown generally by the numeral 460. The client first requests a lock at step 462 through the proxy 200. The server receives the request at step 464 from the proxy 200. If the request is not granted at step 466, then the server informs the client of the denial at step 468. The request is routed through the proxy 200 but the proxy 200 does not operate on the request. If the server grants the request at step 466, then the server sends an update to all proxies in the list of listeners 114 at step 470. The proxies then forward the update to all connected clients 300 at step 472. The update is immediately visible to the connected clients 300.

The central server 100 is responsible for security of the system. It must control who has access to objects in the repository 102. In order to connect to the central server 100, the proxy 200 and client 300 must present a credential such as a password to the access control system 112. Once the proxy 200 or client 300 has identified itself, the central server 100 is assured of its identity.

The access control list 110 keeps track of all of the objects in the repository 102 and the respective permissions of each proxy 200 and client 300. Once the proxy 200 and/or client 300 has authenticated itself through the access control system 112, the central server uses the access control list 110 to validate requests by the proxy 200 or client 300. In normal circumstances, proxy 200 will be allowed access to all data in the repository 102. On the other hand, client 300 will have specific permissions for specific data related to certain objects. In certain circumstances, it will be beneficial to provide certain proxies 200 with access only to certain branches of development. In this case, entire geographic locations will be excluded from accessing certain objects.

Figure 6:
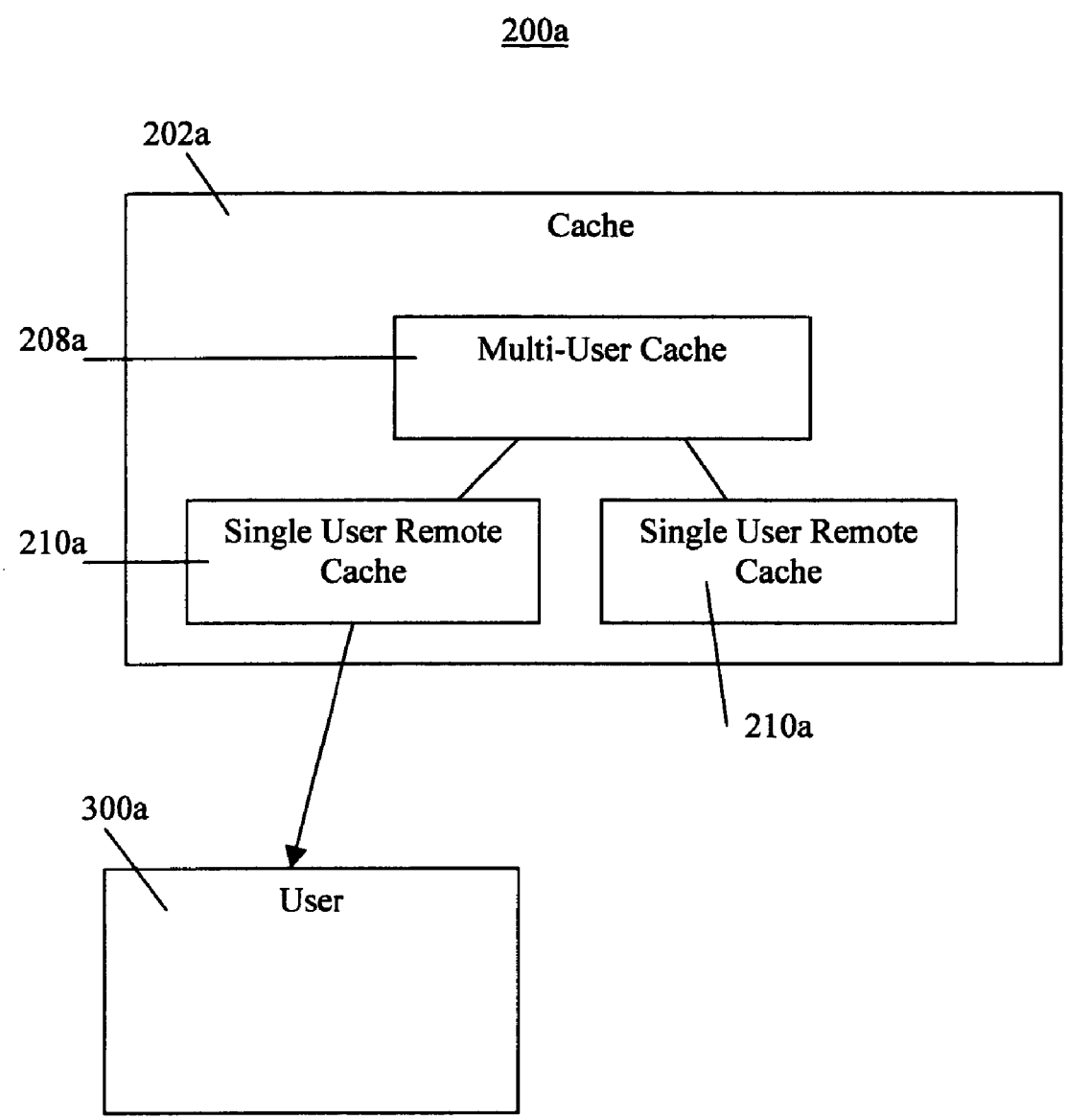
FIG. 6 is a more detailed schematic of a structure used in FIG. 1.

However, each proxy server 200 may be connected to multiple clients 300. In order to ensure that clients 300 do not receive unauthorised access to data cached by the proxy server 200, each proxy server cache 202 may be configured as shown in FIG. 6 by the numeral 200a. In this embodiment, elements are shown with a suffix 'a' for clarity.

Referring therefore to FIG. 6, the proxy cache 202a includes a multi-user cache 208a. The proxy cache 202a also includes a single user remote cache 210a for each client. Each single user remote cache 210a is connected to a respective client to handle security requests.

Figure 7:
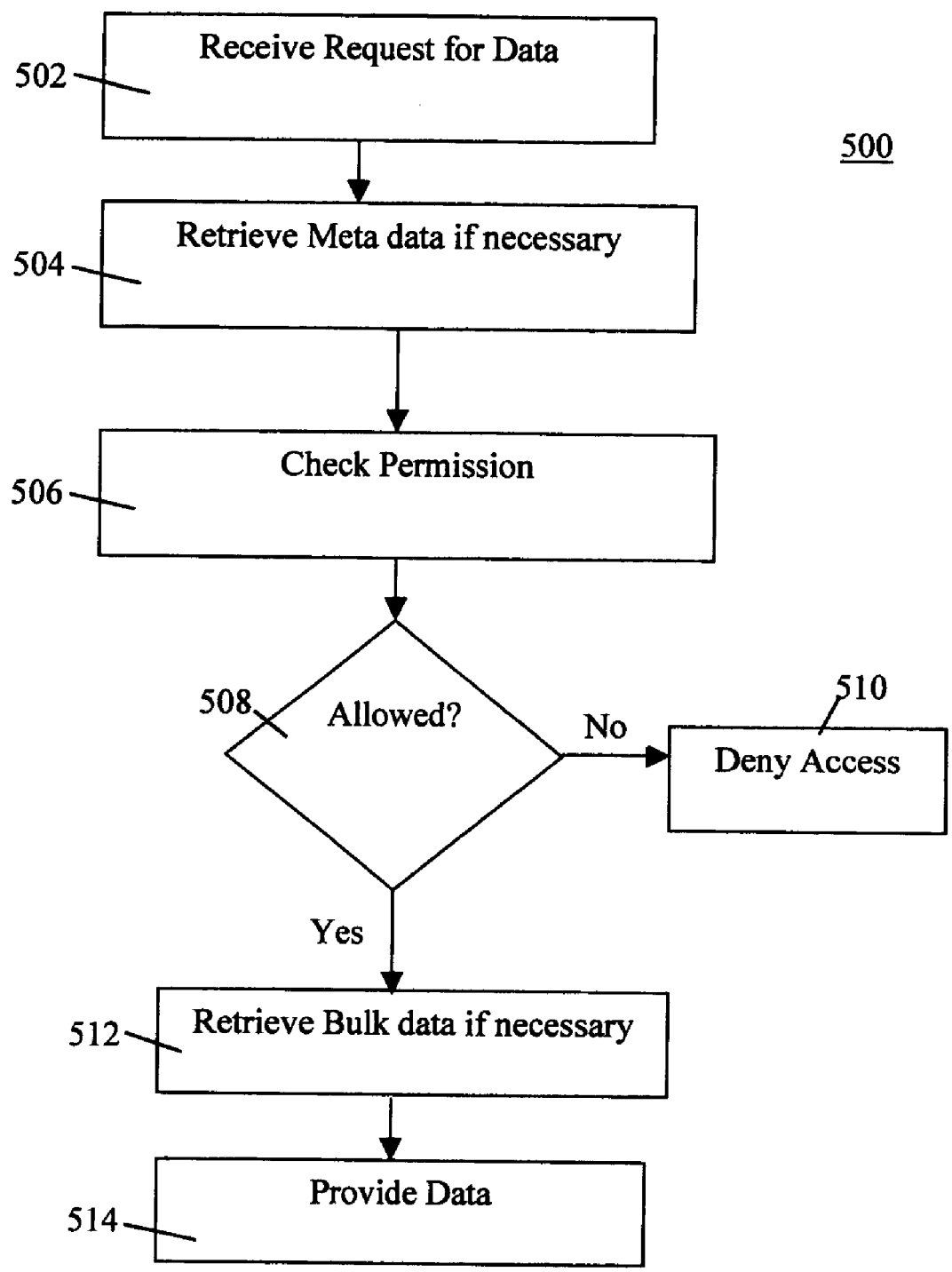
FIG. 7 shows a method using the structure of FIG. 6.

Upon receipt of a request for data, the proxy cache 202a performs the steps of FIG. 7, as shown generally by the numeral 500. At step 502, the proxy cache 202a receives a request for the data. The proxy cache 202a retrieves at step 504 any meta-data necessary to fulfill the request. If the request is for bulk data, the proxy cache 202a retrieves the corresponding meta-data. At step 506, the proxy cache 202a checks the meta-data to see if the client 300 has permission to access the data. If the request is not allowed at step 508, then the proxy cache denies access to the data at step 510. If the request is allowed at step 510, then the proxy cache 202a first retrieves any bulk data necessary to fulfill the request of step 512, and provides the data at step 514.

The client 300 performs a similar series of steps to request data. However, the client 300 does not check permissions itself, but rather receives the result of the check from the proxy 200. The central server 100 performs similar steps, but does not need to obtain the access control list 110.

In another embodiment, enhanced security is provided by virtue of the provision of proxy server 200. In this embodiment, the central server 100 only accepts connections from proxy servers 200. It will not accept connections from clients 300. This configuration provides enhanced security since all communication from clients 300 use proxy servers 200. In addition, the connections between proxy servers 200 and the central server 100 may then be secured, for example using SSL. This provides security over the wide area network while only requiring one secure connection for all of the clients 300 attached to each proxy server 200.

Figure 8:
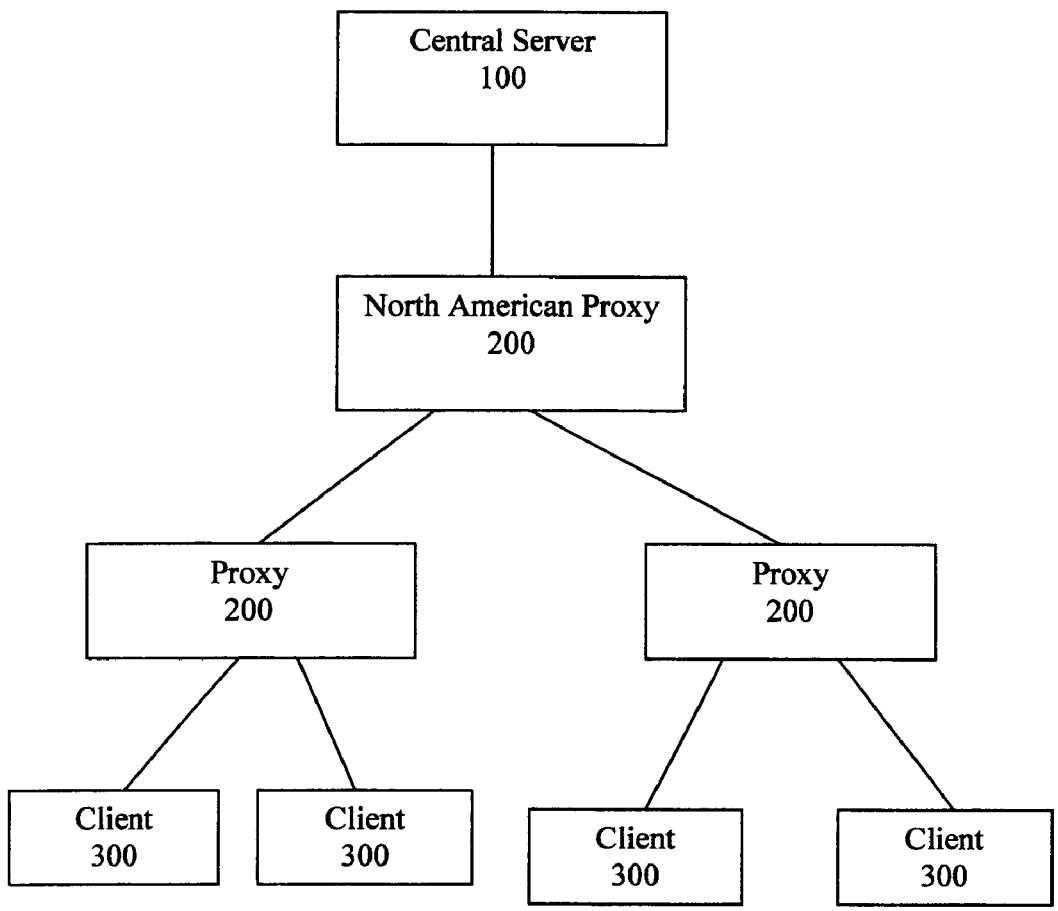
FIG. 8 shows an alternate embodiment of the system of FIG. 1.

In yet another embodiment, further efficiencies may be obtained by chaining one proxy 200 to another proxy 200 as shown in FIG. 8. This allows for shared caching between multiple sites. For example, the central server 100 may be located in Europe, whilst many development sites with proxies 200 are spread through North America. The proxies 200 in North America are chained through one designated North American proxy server, which is the only proxy 200 connected to the central server 100 in Europe. This configuration is advantageous if the network between North American sites is better than the link to Europe. The North American proxy server can then act as a cache for all of the other proxies 200 in North America.

It will be recognised that the version control system reduces load on the central server 100 in most situations. In typical operation, there are more read requests than write requests. The cache in proxy 200 allows these requests to be filled independently of the central server 100. Since only write requests are filled by the central server 100, the load on central server 100 is reduced.

It is generally preferred that the version control system be configured so that the proxy 200 is transparent to the user of client 300. After initial configuration and access control, the user operates the client 300 as if they are communication directly with the central server 100.

In an alternative configuration, the user of client 300 interacts directly with the proxy 200. The proxy 200 can then provide access to multiple central severs 100 to allow the user to work in projects from multiple servers 100. The caching methods described above operate in much the same manner. However, configuration details are only maintained on proxy server 200. The proxy configuration step is no longer necessary on each client 300.

It will be recognised that the functionality of the proxy server 200 may be provided by the central server 100 to clients 300 directly connected to the central server 100. Alternatively, the client 300 may incorporate the functionality of the proxy server 200.

It is noted that provision of the proxy server 200 allows the proxy cache to be kept up to date with the repository 102, at reduced network capacity and/or speed and with heightened security, while providing fast access to local clients 300.

It further noted that network outages at a small number of proxy access points can be managed more efficiently and with less complex recovery procedures than from a large number of clients.

It will be recognised that the use of sandbox 306 is a preferred option. However, it is not necessary to use sandboxes. The sandbox arrangement is one example of a manner of making contents of versioned files available on the client file system.

Although the invention has been described with reference to certain specific embodiments, various modifications thereof will be apparent to those skilled in the art without departing from the spirit and scope of the invention as outlined in the claims appended hereto.

We claim:

1. A method for retrieving data related to versions of files organized in a configuration, said method comprising:

arranging a server device and one or more proxy devices so that each of said one or more proxy devices are between said server device and one or more clients;

providing a repository at said server device for storing multiple versions of the same file and meta data comprising information about the organization and properties of said files into a versioned system, said server device controlling all changes to data in said repository;

providing a server cache at said server device and a proxy cache at each of said one or more proxy devices for storing bulk data and meta data related to said versions of files, said bulk data comprising said versions themselves, said meta data comprising said information about the organization and properties of said files into a versioned system;

registering at said server device respective proxy caches for said one or more proxy devices with a list of listeners maintained by said server device in order to update said proxy caches when changes are made at said server device to said data related to versions of files, said changes being controlled by only said server device;

enabling said server device to transmit updates to said respective proxy caches and enabling said respective proxy caches to receive updates from said server device, said updates made according to changes made to said data related to versions of files according to what is currently stored by a respective one of said proxy caches to synchronize said proxy caches;

enabling said respective proxy caches to be updated using said updates to thereby synchronize said respective proxy caches with said server device;

enabling said one or more proxy devices to provide said updates to said one or more clients for synchronizing one or more client-based caches;

a particular one of said one or more proxy devices receiving a request from one of said clients for one or more desired file versions or a set of meta data;

if said one or more desired file versions or set of meta data is in said particular proxy device's proxy cache, returning said one or more desired filed versions or set of meta data to said one of said clients;

if said one or more desired file versions or set of meta data is not in said particular proxy device's proxy cache, said particular proxy device forwarding said request to said server device, said server device obtaining said one or more desired file versions or set of meta data to said repository, and returning said one or more desired file versions or set of meta data to said particular proxy device, said particular proxy device obtaining from said server device said one or more desired file versions or set of meta data, and returning to said one of said clients said one or more desired file versions or set of meta data; and said particular proxy device forwarding a lock request to said server device on behalf of said one of said clients, and said server device receiving said lock request, whereby said lock request is for said desired file version and, if granted by said server device, permitting only said one of said clients to modify said desired file version.

2. The method in claim 1 further comprising said proxy device presenting a credential to said server device to authenticate said proxy device before said proxy cache is enabled to receive said update from said server device.

3. The method in claim 1 wherein upon receiving said request from said one of said clients for said desired file version or set of meta data, said proxy cache examines said set of meta data to determine if said one of said clients has permission to access said desired file version or set of meta data.

4. The method in claim 1 wherein said configuration of said data related to versions of files comprises a tree structure, said tree structure comprising a plurality of successive versions and one or more alternate revisions.

5. The method in claim 4 wherein one or more changes between any two versions of files are stored as one or more deltas, and said desired file version is reconstructed by said server device using said one or more deltas.

6. The method in claim 1 wherein each of said one or more clients has a sandbox for locally storing said data related to versions of files.

7. A method for retrieving data related to versions of files organized in a configuration, said method comprising:

arranging a server device in communication with one or more proxy devices arranged to be between said server device and one or more clients, each of said one or more proxy device comprising a proxy cache;

providing a repository at said server device for storing multiple versions of the same file and meta data comprising information about the organization and properties of said files into a versioned system, said server device controlling all changes to data in said repository;

providing a server cache at said server device for storing bulk data and meta data related to said versions of files, said bulk data comprising said versions themselves, said meta data comprising said information about the organization and properties of said files into a versioned system;

registering at said server device respective proxy caches for said one or more proxy devices with a list of listeners maintained by said server device in order to update said proxy caches when changes are made at said server device to said data related to versions of files, said changes being controlled by only said server device;

enabling said server device to transmit updates to said respective proxy caches according to changes made to said data related to versions of files according to what is currently stored by a respective one of said proxy caches to synchronize said proxy caches;

receiving a request from one of said proxy devices on behalf of one of said clients for one or more desired file versions or a set of meta data when said request cannot be fulfilled by said one of said proxy devices;

if said one or more desired file versions or set of meta data is in said server cache, returning said one or more desired filed versions or set of meta data to said one of said proxy devices; and if said one or more desired file versions or set of meta data is not in said server cache, said server device obtaining said one or more desired file versions or set of meta data using said repository, and returning said one or more desired file versions or set of meta data to said one of said proxy devices to enable said proxy device to fulfill said request made by said one of said clients; and said server device receiving a lock request from said one of said proxy device on behalf of said one of said clients, said lock request for said desired file version and, if granted by said server device, permitting only said one of said clients to modify said desired file version.

8. The method in claim 7 further comprising said proxy device presenting a credential to said server device to authenticate said proxy device before said proxy cache is enabled to receive said update from said server device.

9. The method in claim 7 wherein upon said proxy device receiving said request from said one of said clients for said desired file version or set of meta data, said proxy cache examines said set of meta data to determine if said one of said clients has permission to access said desired file version or set of meta data.

10. The method in claim 7 wherein said configuration of said data related to versions of files comprises a tree structure, said tree structure comprising a plurality of successive versions and one or more alternate revisions.

11. The method in claim 10 wherein one or more changes between any two versions of files are stored as one or more deltas and said server device reconstructing said desired file version using said one or more deltas when obtaining said desired file version from said repository.

12. The method in claim 7 wherein each of said one or more clients has a sandbox for locally storing said data related to versions of files.

13. A computer readable medium comprising computer executable instructions for retrieving data related to versions of files organized in a configuration, said computer readable medium comprising instructions for:

arranging a server device and one or more proxy devices so that each of said one or more proxy devices are between said server device and one or more clients;

providing a repository at said server device for storing multiple versions of the same file and meta data comprising information about the organization and properties of said files into a versioned system, said server device controlling all changes to data in said repository:

providing a server cache at said server device and a proxy cache at each of said one or more proxy devices for storing bulk data and meta data related to said versions of files, said bulk data comprising said versions themselves, said meta data comprising said information about the organization and properties of said files into a versioned system;

registering at said server device respective proxy caches for said one or more proxy devices with a list of listeners maintained by said server device in order to update said proxy caches when changes are made at said server device to said data related to versions of files, said changes being controlled by only said server device;

enabling said server device to transmit updates to said respective proxy caches and enabling said respective proxy caches to receive updates from said server device, said updates made according to changes made to said data related to versions of files according to what is currently stored by a respective one of said proxy caches to synchronize said proxy caches;

enabling said respective proxy caches to be undated using said updates to thereby synchronize said respective proxy caches with said server device;

enabling said one or more proxy devices to provide said updates to said one or more clients for synchronizing one or more client-based caches;

a particular one of said one or more proxy devices receiving a request from one of said clients for one or more desired file versions or a set of meta data;

if said one or more desired file versions or set of meta data is in said particular proxy device's proxy cache, returning said one or more desired filed versions or set of meta data to said one of said clients;

if said one or more desired file versions or set of meta data is not in said particular proxy device's proxy cache, said particular proxy device forwarding said request to said server device, said server device obtaining said one or more desired file versions or set of meta data to said repository, and returning said one or more desired file versions or set of meta data to said particular proxy device, said particular proxy device obtaining from said server device said one or more desired file versions or set of meta data, and returning to said one of said clients said one or more desired file versions or set of meta data; and said particular proxy device forwarding a lock request to said server device on behalf of said one of said clients, and said server device receiving said lock request, whereby said lock request is for said desired file version and, if granted by said server device, permitting only said one of said clients to modify said desired file version.

14. The computer readable medium in claim 13 further comprising instructions for said proxy device to present a credential to said server device to authenticate said proxy device before said proxy cache is enabled to receive said update from said server device.

15. The computer readable medium in claim 13 wherein upon receiving said request from said one of said clients for said desired file version or set of meta data, said proxy cache is able to examine said set of meta data to determine if said one of said clients has permission to access said desired file version or set of meta data.

16. The computer readable medium in claim 13 wherein said configuration of said data related to versions of files comprises a tree structure, said tree structure comprising a plurality of successive versions and one or more alternate revisions.

17. The computer readable medium in claim 16 wherein one or more changes between any two versions of files are stored as one or more deltas, and said desired file version is reconstructed by said server device using said one or more deltas.

18. The computer readable medium in claim 13 wherein each of said one or more clients has a sandbox for locally storing said data related to versions of files.

19. A system for retrieving data related to versions of files organized in a configuration, said system comprising:

a server device in communication with one or more proxy devices arranged in between said server device and one or more clients, each of said one or more proxy devices comprising a proxy cache, said server device comprising a processor and a repository for storing multiple versions of the same file and meta data comprising information about the organization and properties of said files into a versioned system, said server device controlling all changes to data in said repository, said server device also comprising a server cache for storing bulk data and meta data related to said versions of files, said bulk data comprising said versions themselves, said meta data comprising information about the organization and properties of said files into a versioned system; said server device registering respective proxy caches for said one or more proxy devices with a list of listeners maintained by said server device in order to update said proxy caches when changes are made at said server device to said data related to versions of files, said changes being controlled by only said server device; said server device configured to transmit updates to said respective proxy caches according to changes made to said data related to versions of files according to what is currently stored by a respective one of said proxy caches to synchronize said proxy caches; said server device configured for receiving a request from one of said proxy devices on behalf of one of said clients for one or more desired file versions or a set of meta data when said request cannot be fulfilled by said one of said proxy devices; and said processor configured such that:

if said one or more desired file versions or set of meta data is in said server cache, returning said one or more desired filed versions or set of meta data to said one of said proxy devices;

if said one or more desired file versions or set of meta data is not in said server cache, said server device obtaining said one or more desired file versions or set of meta data using said repository, and returning said one or more desired file versions or set of meta data to said one of said proxy devices to enable said proxy device to fulfill said request made by said one of said clients; and wherein said server device is further configured to receive a lock request from said one of said proxy device on behalf of said one of said clients, said lock request for said desired file version and, if granted by said server device. permitting only said one of said clients to modify said desired file version.

20. The system in claim 19 wherein said server device is configured to receive a credential from said proxy device to authenticate said proxy device before said proxy cache is enabled to receive said update from said server device.

21. The method in claim 19 wherein upon said proxy device receiving said request from said one of said clients for said desired file version or set of meta data, said proxy cache is configured to examine said set of meta data to determine if said one of said clients has permission to access said desired file version or set of meta data.

22. The system in claim 19 wherein said configuration of said data related to versions of files comprises a tree structure, said tree structure comprising a plurality of successive versions and one or more alternate revisions.

23. The system in claim 22 wherein one or more changes between any two versions of files are stored as one or more deltas and said server device reconstructing said desired file version using said one or more deltas when obtaining said desired file version from said repository.

24. The system in claim 19 wherein each of said one or more clients has a sandbox for locally storing said data related to versions of files.

25. A computer readable medium comprising computer executable instructions for retrieving data related to versions of files organized in a configuration, said computer executable instructions comprising instructions for:

arranging a server device in communication with one or more proxy devices arranged to be between said server device and one or more clients, each of said one or more proxy device comprising a proxy cache;

providing a repository at said server device for storing multiple versions of the same file and meta data comprising information about the organization and properties of said files into a versioned system, said server device controlling all changes to data in said repository;

providing a server cache at said server device for storing bulk data and meta data related to said versions of files, said bulk data comprising said versions themselves, said meta data comprising said information about the organization and properties of said files into a versioned system;

registering at said server device respective proxy caches for said one or more proxy devices with a list of listeners maintained by said server device in order to update said proxy caches when changes are made at said server device to said data related to versions of files, said changes being controlled by only said server device;

enabling said server device to transmit updates to said respective proxy caches according to changes made to said data related to versions of files according to what is currently stored by a respective one of said proxy caches to synchronize said proxy caches;

receiving a request from one of said proxy devices on behalf of one of said clients for one or more desired file versions or a set of meta data when said request cannot be fulfilled by said one of said proxy devices;

if said one or more desired file versions or set of meta data is in said server cache, returning said one or more desired filed versions or set of meta data to said one of said proxy devices;

if said one or more desired file versions or set of meta data is not in said server cache, said server device obtaining said one or more desired file versions or set of meta data using said repository, and returning said one or more desired file versions or set of meta data using said one of said proxy devices to enable said proxy device to fulfill said request made by said one of said clients; and said server device receiving a lock request from said one of said proxy device on behalf of said one of said clients, said lock request for said desired file version and, if granted by said server device, permitting only said one of said clients to modify said desired file version.

26. The computer readable medium in claim 25 further comprising computer executable instructions for said proxy device presenting a credential to said server device to authenticate said proxy device before said proxy cache is enabled to receive said update from said server device.

27. The computer readable medium in claim 25 wherein upon said proxy device receiving said request from said one of said clients for said desired file version or set of meta data, said proxy cache examines said set of meta data to determine if said one of said clients has permission to access said desired file version or set of meta data.

28. The computer readable medium in claim 25 wherein said configuration of said data related to versions of files comprises a tree structure, said tree structure comprising a plurality of successive versions and one or more alternate revisions.

29. The computer readable medium in claim 28 wherein one or more changes between any two versions of files are stored as one or more deltas and said server device reconstructing said desired file version using said one or more deltas when obtaining said desired file version from said repository.

30. The computer readable medium in claim 25 wherein each of said one or more clients has a sandbox for locally storing said data related to versions of files.

* * * * *